March 24, 1942.  J. W. GALLAGHER  2,277,314
FLUID MIXING APPARATUS
Filed June 17, 1940
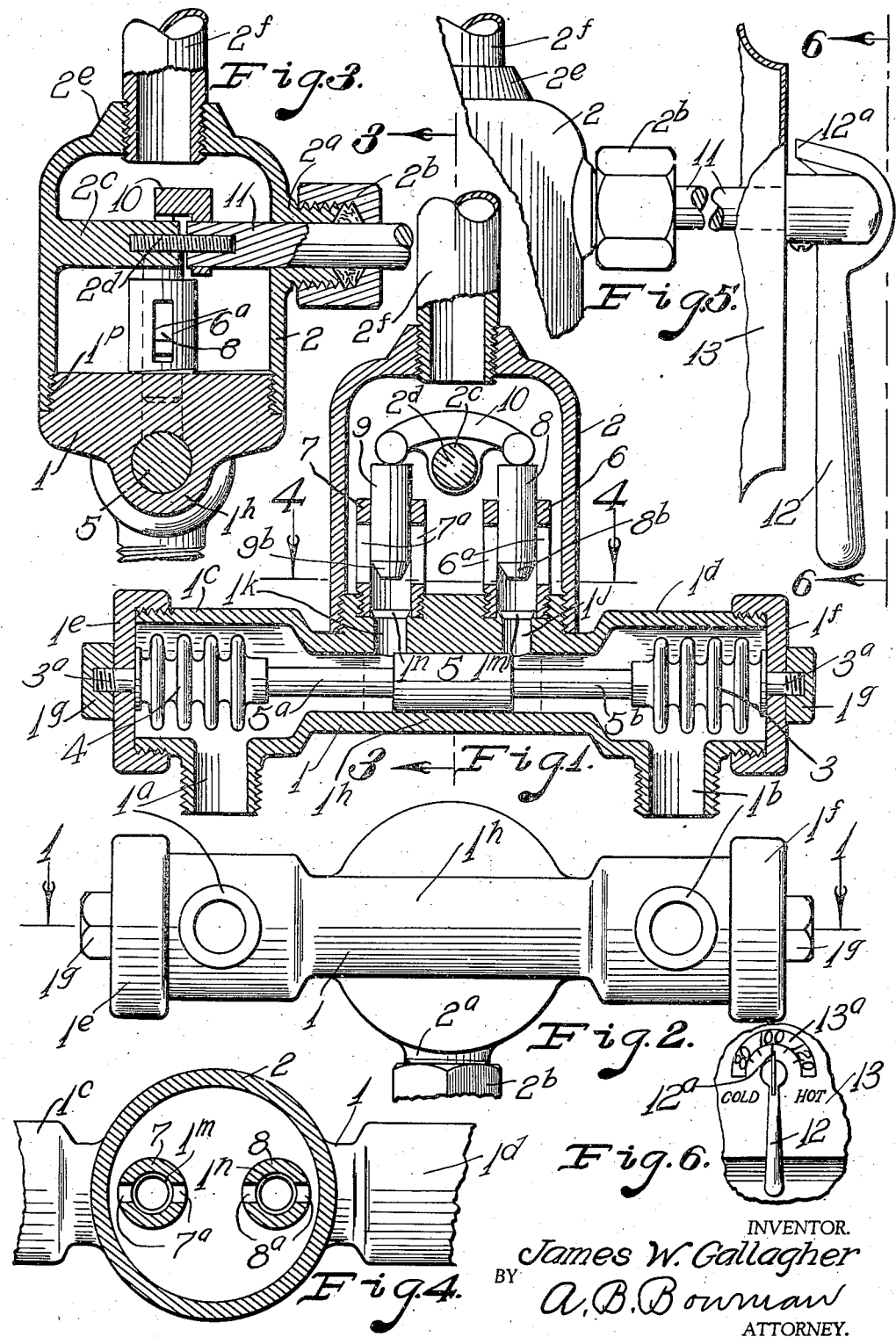
INVENTOR.
James W. Gallagher
BY A. B. Bowman
ATTORNEY.

Patented Mar. 24, 1942

2,277,314

UNITED STATES PATENT OFFICE 2,277,314

FLUID MIXING APPARATUS

James W. Gallagher, Chula Vista, Calif., assignor of one-half to Arthur W. Schiefer, San Diego, Calif.

Application June 17, 1940, Serial No. 340,945

8 Claims. (Cl. 236—12)

My invention relates to a fluid mixing apparatus more particularly for use in mixing hot and cold water and the objects of my invention are:

First, to provide a fluid mixing apparatus of this class which may be effectively used in mixing various fluids of varying pressures and temperatures;

Second, to provide a fluid mixing apparatus of this class which automatically compensates for climatically effected changes in the temperature of one of the fluids and also compensates for pressure changes of both fluids to be mixed therein;

Third, to provide a fluid mixing apparatus of this class in which the opposed bellows, each in pressure communicative relation with a fluid inlet, cooperate to simultaneously control both fluid volume outlets relatively to each other;

Fourth, to provide a fluid mixing apparatus of this class wherein bellows in communicative relation with the cold water inlet are thermostatically charged with violatile fluid arranged to compensate for temperature changes in the cold water;

Fifth, to provide a fluid mixing apparatus of this class in which opposed inlet conductors surround pressure operated interconnected bellows which are arranged to control the relative mixture of the two fluids passing therethrough;

Sixth, to provide a fluid mixture apparatus of this class in which the passage of both hot and cold water is shut off when either the supply of cold or hot water fails;

Seventh, to provide a fluid mixing apparatus of this class which is particularly adapted for use in connection with heaters or hot water supply means in which the hot water remains at a constant degree of temperature;

Eighth, to provide a fluid mixing apparatus of this class in which an adjustable valve means is arranged for use in setting the desired fluid mixture, while opposed bellows control the flow of fluid through said valve means by the action of fluid pressure on said bellows which control variable volume valve means in communication with said adjustable valve means;

Ninth, to provide a fluid mixing apparatus of this class which operates equally well in any inverted, tilted or other position in which it may be placed; and Tenth, to provide a fluid mixing apparatus of this class which is very simple and economical of construction, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a longitudinal sectional view of my fluid mixing apparatus taken from the line 1—1 of Fig. 2 showing parts and portions in elevation to facilitate the illustration; Fig. 2 is a fragmentary bottom view thereof; Fig. 3 is a fragmentary sectional view taken from the line 3—3 of Fig. 1 showing parts and portions in elevation to facilitate the illustration; Fig. 4 is a fragmentary sectional view taken from the line 4—4 of Fig. 1; Fig. 5 is a fragmentary elevational view of my fluid mixing apparatus showing portions broken away and in section to facilitate the illustration and Fig. 6 is a reduced fragmentary elevational view taken from the line 6—6 of Fig. 5.

Similar characters of reference refer to similar parts and portions throughout the several views of the drawing:

The inlet casing member 1, outlet casing member 2, bellows 3 and 4, variable passage control valve member 5, valve casing members 6 and 7, mixture adjusting valve members 8 and 9, valve adjusting cam member 10, cam member operating shaft 11, cam member operating lever 12, and the face plate 13 constitute the principal parts and portions of my fluid mixing apparatus.

The inlet casing member 1 is provided with a cold water inlet conductor portion 1a and a hot water inlet conductor portion 1b, as shown best in Figs. 1 and 2 of the drawing. These inlet conductor portions 1a and 1b are arranged to conduct cold and hot water into the enlarged casing portions 1c and 1d respectively which surround the bellows 4 and 3 respectively. Secured on these casing portions 1c and 1d in opposed relation to each other are casing cap members 1e and 1f, respectively, which are arranged to enclose the opposite ends of the casing member 1 and also support one end of each of these bellows 3 and 4.

These bellows 3 and 4 are each provided with an outwardly extending screw threaded portion 3a which extends through the cap member 1e or 1f, and these screw threaded portions 3ª are secured in these cap members 1e and 1f by the internally screw threaded nuts 1g which are positioned on the outer side of each of the cap members 1e and 1f, as shown best in Fig. 1 of the drawing. The bellows 3 and 4 are of hollow collapsible construction and are arranged to be collapsed relatively with the degree of water pressure in the casing portion 1c and 1d of the inlet casing 1. The bellows 4 in communicative relation with the cold water inlet conductor portion 1a are internally charged with a highly volatile fluid, such as ether or the like, which is arranged to expand the bellows when the cold water becomes slightly heated or rises to a temperature above the normal of the cold water supply. The bellows 3 are in communicative relation with the hot water inlet conductor portion 1b and this inlet conductor portion 1b is arranged to be connected in communicative relation with a hot water supply means which maintains hot water at a constant degree of temperature.

Intermediate the casing portions 1c and 1d is a substantially hollow cylindrical casing portion 1h in which the variable passage control valve member 5 is reciprocally positioned. This control valve member 5 is provided with oppositely extending rod portions 5a and 5b. The rod portion 5a is rigidly secured to the bellows 4 and the rod portion 5b is rigidly secured to the bellows 3, it being noted that this control valve member 5 is rigidly interposed between the bellows 3 and 4 and is arranged to reciprocate in the casing portion 1h and to pass back and forth therein varying the volume of fluid passing through the passage openings 1j and 1k in communicative relation with the hot and cold water respectively.

The valve casing members 6 and 7 are substantially hollow and cylindrical in form and are arranged in screw threaded connected relation with the inlet casing member 1 in communicative relation with the passage openings 1j and 1k, as shown best in Fig. 1 of the drawing. These valve casing members 6 and 7 are each provided with slotted portions 6a and 7a respectively in opposite sides of their side walls, as shown best in Figs. 1, 3 and 4 of the drawing.

Reciprocally mounted in these valve casing members 6 and 7 are the adjusting valve members 8 and 9, as shown best in Fig. 1 of the drawing. These adjusting valve members 8 and 9 are substantially cylindrical in form and are preferably solid members provided with tapered valve face portions 8b and 9b respectively which are arranged to engage the face portions 1m and 1n at the upper end of the passage opening 1j and 1k in the inlet casing member 1, as shown best in Fig. 1 of the drawing.

Screw threaded on the screw threaded portion 1p of the inlet casing member 1 is the outlet casing member 2. This outlet casing member 2 is arranged to enclose the adjusting valve members 8 and 9 and the adjusting cam member 10 which is fixed on the cam member operating shaft 11, as shown best in Figs. 1 and 3 of the drawing. It will be noted that this cam member operating shaft 11 is revolubly mounted in the boss portion 2a of the outlet casing member 2 and that the cam member 10 is provided with two oppositely extending arms arranged to engage the outwardly extending end portions of each of the mixture adjusting valve members 8 and 9, as shown best in Fig. 1 of the drawing. Screw threaded on the outer side of the boss portion 2a is a packing nut 2b, arranged to prevent water from passing outwardly from the outlet casing 2 around the cam member operating shaft 11. The outlet casing member 2 is provided with an inwardly extending integral portion 2c in the extending end of which is screw threaded a stud 2d which is arranged in screw threaded connected connection with the cam member operating shaft 11, as shown best in Fig. 3 of the drawing. Screw threaded in the boss portion 2e of the outlet casing member 2 is the outlet pipe 2f which is arranged to conduct the mixture of hot and cold water to the outlet faucet or other appliances.

The outwardly extending end of the cam member operating shaft 11 extends through the face plate 13 and the cam member operating lever 12 is secured on said outwardly extending end of the shaft 11 adjacent the face plate 13 upon which a calibrated scale 13a is positioned for use in cooperative relation with the pointer portion 12a of the lever 12 for setting the desired mixture of the hot and cold water by the valve members 8 and 9 in engagement with the cam member 10, all as shown best in Figs. 5 and 6. The face plate 13 may be secured on the outer surface of a wall or the like and the principal mechanism of my fluid mixing apparatus may be positioned behind the wall and out of sight.

The operation of my fluid mixing apparatus is substantially as follows:

The inlet conductor portion 1b of the inlet casing member 1 is connected in communicative relation with a hot water supply conductor in which the hot water is maintained at a constant degree of temperature. The inlet conductor portion 1a is secured in communicative relation with any conventional cold water supply conductor means. The cold water entering the casing portion 1c around the bellows 4 is arranged to pass through the passage opening 1k, outwardly through the slotted portions 7a of the valve casing member 7 into the outlet casing 2 and outwardly through the outlet conductor 2f. Hot water passing through the conductor portion 1b of the inlet casing member 1 around the bellows 3 passes through the passage opening 1j outwardly through the slotted portions 6a of the valve casing member 6 into the outlet casing 2 and finally passes outwardly through the outlet conductor tube 2f in mixed relation with the cold water issuing from the slotted portions 7a of the valve casing member 7.

It will be noted that the pressure of the cold and hot water in the casing portions 1c and 1d act upon the bellows 3 and 4 and the greater the pressure of water in these casing portions 1d, the more the individual set of bellows in the particular casing portion will be compressed tending to move the variable passage control valve member 5 in the direction of the greatest pressure whether it be in the casing portion 1c or the casing portion 1d in cooperative relation with the bellows 4 and 3 respectively. Therefore if the greatest water pressure exists in the casing portion 1c, the bellows 4 will be compressed more than the bellows 3 in the casing portion 1d tending to move the variable passage control valve member 5 in the direction of the bellows 4 partially shutting off the passage opening 1k and opening the passage opening 1j proportionately. If the greatest water pressure exists in the casing portion 1d, the bellows 3 will be compressed a certain amount tending to force the variable passage control valve member 5 toward the bellows 3 partially shutting off the passage opening 1j and opening the passage opening 1k proportionately. If the water pressure is the same in both casing portions 1c and 1d, the variable passage control member will be held in the intermediate relation with the passage openings 1k and 1j, as shown in Fig. 1 of the drawing. When the cold water is heated by climatic changes or other effected changes and the water in the cold water supply conductor reaches a temperature which exceeds the normal cold water temperature, the volatile fluid in the bellows 4 expands providing a relative shifting action of the variable passage control valve member 5 so that a greater volume of the cold water is permitted to pass through the opening 1k relatively with the passage of hot water in the opening 1j.

It will be noted that the tilting of the cam member 10 by means of the cam member operating lever 12 in connection with the cam member operating shafts 11 causes one or the other of the adjusting valve members 8 and 9 to shift inwardly while the opposite valve member shifts outwardly providing a varying outlet area through the slotted portions 6a and 7a of the valve casing members 6 and 7 relatively with each other, at the inner end portions of the valve members 8 and 9. When these adjusting members 8 and 9 are set for a certain mixture temperature, the bellows 3 and 4 in engagement with water pressure from the cold water and hot water supply conductors maintain the temperature mixture in the casing member 2 at a constant degree regardless of pressure changes in the cold and hot water supply conductors caused by voluminous usage of water by nearby fixtures connected to said hot and cold water supply conductors. If the adjusting valve members 8 and 9 are positioned, as shown in Fig. 1 of the drawing, so that the outlet area of the valve casing members 6 and 7 are equal and the pressure of the cold water in communication with the bellows 4 decreases, the bellows 3 is slightly compressed by the relatively greater pressure of the hot water tending to move the variable passage control valve member toward the bellows member 3 providing a relatively larger volume head of cold water to pass through the passage opening 1k. It will be understood that a relatively large volume head of water at a low pressure passing through the opening 1k will be equalized by a relatively small volume head of water at a higher pressure passing through the opening 1j. Therefore, the hot and cold water will pass outwardly from the valve casing members 6 and 7 in proper relative mixing amounts no matter how the pressure of the hot or cold water varies. If the pressure of the cold water or hot water should fail entirely, the set of bellows opposing the inlet of the failing water pressure will be collapsed and this action will shut off the passage opening corresponding with the remaining water pressure by means of the variable passage control valve member 5, entirely shutting off the passage of water into the outlet casing 2.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a fluid mixing apparatus of the class described, the combination of an inlet casing member provided with separate cold and hot water inlets, separate bellows in close direct communication with each of said inlets and a cylindrical variable passage control valve member rigidly interposed between said bellows and reciprocally mounted in said inlet casing, said inlet casing provided with outlet passage openings therein arranged in communicative relation with opposite ends of said variable passage control valve member.

2. In a fluid mixing apparatus of the class described, the combination of an inlet casing member provided with separate cold and hot water inlets, separate bellows in close direct communication with each of said inlets, a cylindrical variable passage control valve member rigidly interposed between said bellows and reciprocally mounted in said inlet casing, said inlet casing provided with outlet passage openings therein arranged in communicative relation with opposite ends of said variable passage control valve member, a pair of separate mixture adjusting valves in cooperative relation with said outlet passage openings in said inlet casing member, and a valve adjusting cam member engaging both of said mixture adjusting valve members and pivotally mounted on an axis intermediate said mixture adjusting valve members.

3. In a fluid mixing apparatus of the class described the combination of an inlet casing member provided with separate cold and hot water inlets, separate bellows in close direct communication with each of said inlets and a cylindrical variable passage control valve member rigidly interposed between said bellows and reciprocally mounted in said inlet casing, said inlet casing provided with outlet passage openings therein arranged in communicative relation with opposite ends of said variable passage control valve member, a pair of separate mixture adjusting valves in cooperative relation with said outlet passage openings in said inlet casing member, a valve adjusting cam member engaging both of said mixture adjusting valve members and pivotally mounted on an axis intermediate said mixture adjusting valve members, and a separate outlet casing member enclosing said mixture adjusting valve members.

4. In a fluid mixing apparatus of the class described, the combination of a pair of opposed bellows, an inlet casing member provided with hot and cold water inlets encasing said bellows and in close direct communication therewith, a variable passage control valve member reciprocally positioned intermediate and arranged to rigidly interconnect said opposed bellows, and separate cylindrical mixture adjusting valves in direct communicative relation with the opposite ends of said variable passage control valve member.

5. In a fluid mixing apparatus of the class described, the combination of a pair of opposed bellows, an inlet casing member provided with hot and cold water inlets encasing said bellows and in close direct communication therewith, a variable passage control valve member reciprocally positioned intermediate and arranged to rigidly interconnect said opposed bellows, separate cylindrical mixture adjusting valves in direct communicative relation with the opposed ends of said variable passage control valve member, and a valve adjusting cam member engaging both of said mixture adjusting valve members and pivotally mounted on an axis intermediate said mixture adjusting valve members.

6. In a fluid mixing apparatus of the class described, the combination of a pair of opposed bellows, an inlet casing member provided with hot and cold water inlets encasing said bellows and in close direct communication therewith, a variable passage control valve member reciprocally positioned intermediate and arranged to rigidly interconnect said opposed bellows, separate cylindrical mixture adjusting valves in direct communicative relation with the opposite ends of said variable passage control valve member, a valve adjusting cam member engaging both of said mixture adjusting valve members and pivotally mounted on an axis intermediate said mixture adjusting valve members, and a separate outlet casing member enclosing said adjusting valve members.

7. In a fluid mixing apparatus of the class described, the combination of an inlet casing provided with separate hot and cold water inlets and outlets, a single cylindrical valve member reciprocally mounted in said inlet casing intermediate said outlets and arranged to alternately close and open said outlets, and separate bellows rigidly connected with said single cylindrical valve member and communicating with said hot and cold water inlets.

8. In a fluid mixing apparatus of the class described, the combination of an inlet casing provided with separate hot and cold water inlets and outlets, a single cylindrical valve member reciprocally mounted in said inlet casing intermediate said outlets and arranged to alternately close and open said outlets, and separate bellows rigidly connected with said single cylindrical valve member and communicating with said hot and cold water inlets, one of said bellows in communication with the cold water inlet provided with volatile fluid temperature control means therein.

JAMES W. GALLAGHER.